United States Patent
Kume et al.

(10) Patent No.: US 9,333,870 B2
(45) Date of Patent: May 10, 2016

(54) NON-CONTACT CHARGING SYSTEM

(71) Applicant: HONDA MOTOR CO., LTD., Tokyo (JP)

(72) Inventors: Yasuhisa Kume, Wako (JP); Shuta Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 14/321,814

(22) Filed: Jul. 2, 2014

(65) Prior Publication Data

US 2015/0035482 A1 Feb. 5, 2015

(30) Foreign Application Priority Data

Jul. 30, 2013 (JP) ................................. 2013-158180

(51) Int. Cl.
| | | |
|---|---|---|
| *H02J 7/00* | (2006.01) | |
| *B60L 1/00* | (2006.01) | |
| *B60L 11/18* | (2006.01) | |
| *H02J 7/02* | (2016.01) | |

(52) U.S. Cl.
CPC ........... *B60L 11/182* (2013.01); *B60L 11/1829* (2013.01); *B60L 11/1833* (2013.01); *H02J 7/025* (2013.01); *Y02T 10/7005* (2013.01); *Y02T 90/14* (2013.01)

(58) Field of Classification Search
CPC ............. H02J 7/025; H02J 7/04; H01F 38/14; H01F 27/42; H04B 5/0037; H04B 5/0031; B60L 11/182; B60L 11/1838; B60L 11/1818; B60L 11/1846; B60L 11/1862
USPC .................... 320/109, 108; 307/9.1
See application file for complete search history.

(56) References Cited

U.S. PATENT DOCUMENTS

| | | | | |
|---|---|---|---|---|
| 7,923,971 B2 * | 4/2011 | Kojima | ..................... | B60L 3/04 307/112 |
| 8,030,888 B2 * | 10/2011 | Pandya | ................... | B60L 5/005 320/108 |
| 8,178,995 B2 * | 5/2012 | Amano | ................. | B60L 11/182 307/104 |
| 8,339,097 B2 * | 12/2012 | Kojima | ................... | H02J 7/025 320/106 |
| 9,130,386 B2 * | 9/2015 | Kawano | ................... | H02J 5/005 |
| 9,199,547 B2 * | 12/2015 | Kai | ....................... | B60L 11/182 |
| 2012/0205988 A1 * | 8/2012 | Tanabe | ................... | H02J 7/025 307/104 |
| 2013/0015699 A1 * | 1/2013 | Mita | ...................... | H02J 5/005 307/9.1 |
| 2014/0354068 A1 * | 12/2014 | Horiuchi | ................. | B60L 11/14 307/104 |
| 2015/0102664 A1 * | 4/2015 | Tatsuta | ................. | B60L 11/182 307/9.1 |

FOREIGN PATENT DOCUMENTS

JP 2013-021886 1/2013

\* cited by examiner

*Primary Examiner* — M'Baye Diao
(74) *Attorney, Agent, or Firm* — Mori & Ward, LLP (57) ABSTRACT

A non-contact charging system includes a charging device and a mobile object. The charging device includes a transmitter. The transmitter is provided at a predetermined position in a charging area and has a power transmission surface to transmit electric power using a magnetic field. The mobile object includes a receiver. The receiver is provided in the mobile object and has a power reception surface to receive the electric power from the charging device through the transmitter. The power transmission surface faces the power reception surface when the mobile object enters the charging area. At least one of the power transmission surface and the power reception surface is tilted relative to ground in the charging area in a longitudinal direction of the mobile object.

15 Claims, 10 Drawing Sheets

NON-CONTACT CHARGING SYSTEM

CROSS-REFERENCE TO RELATED APPLICATIONS

The present application claims priority under 35 U.S.C. §119 to Japanese Patent Application No. 2013-158180, filed Jul. 30, 2013, entitled "Non-contact Charging System." The contents of this application are incorporated herein by reference in their entirety.

BACKGROUND

1. Field

The present disclosure relates to a non-contact charging system.

2. Description of the Related Art

A known non-contact charging system charges, for example, an electric vehicle in a non-contact manner by utilizing a physical phenomenon such as electromagnetic induction. Such a system needs to adjust the positional relationship between a device that transmits electric power (hereinafter referred to as a transmitter) and a device that receives the electric power (hereinafter referred to as a receiver) appropriately before a charging operation is performed.

Figure 10A:
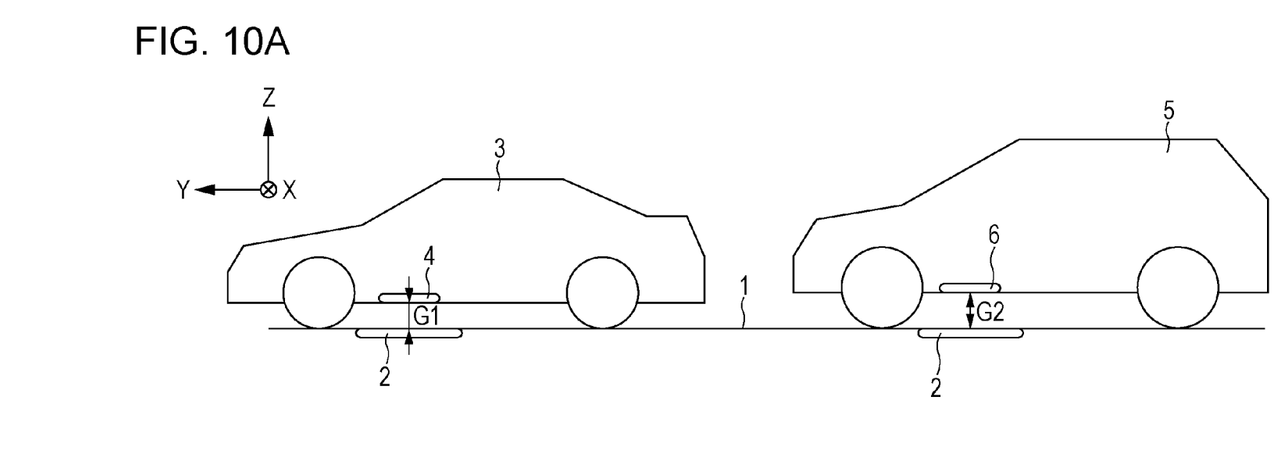
FIGS. 10A and 10B schematically show a relationship between a displacement amount of three-dimensional positions of a transmitter and a receiver and a transmission efficiency of electric power.
Figure 10B:
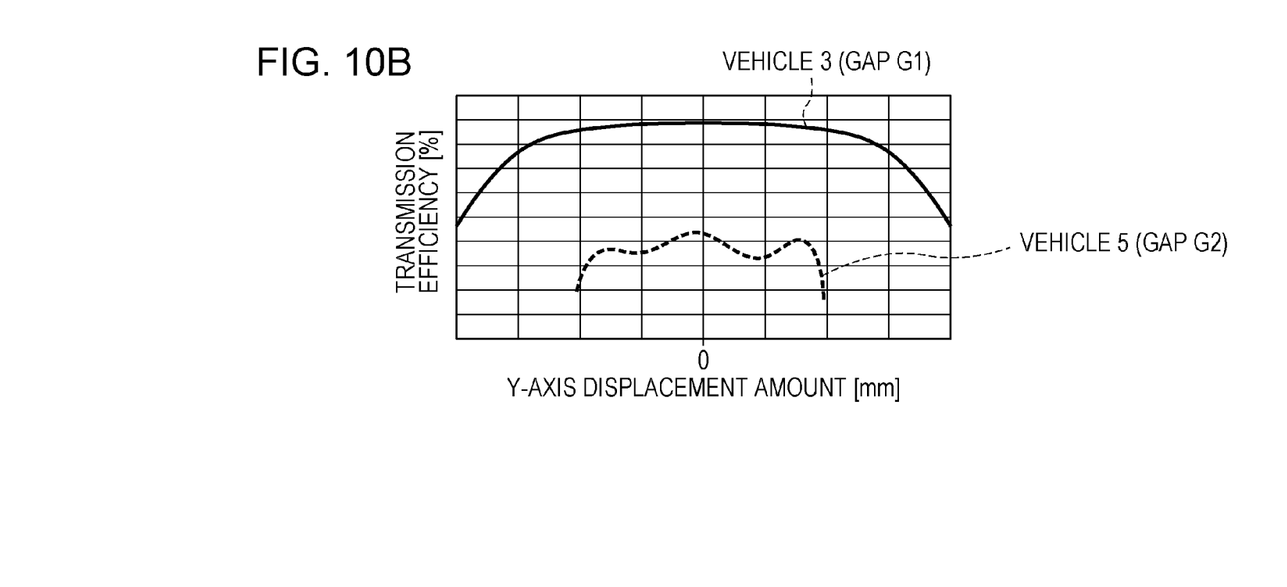

As illustrated in FIG. 10A, suppose a transmitter 2 on the ground 1 transmits electric power, and a receiver 4 in a vehicle 3 and a receiver 6 in a vehicle 5 receive the electric power. Here, the vehicles 3 and 5 belong to different vehicle size classes, and a gap G2 between the transmitter 2 and the receiver 6 is larger than a gap G1 between the transmitter 2 and the receiver 4. As shown in FIG. 10B, electric power transmission efficiency tends to decrease as the three-dimensional positional displacement (in horizontal and vertical directions) between the transmitter and the receiver increases. In the graph, the solid line represents the transmission efficiency of the vehicle 3 (the gap G1), and the broken line represents the transmission efficiency of the vehicle 5 (the gap G2).

Japanese Unexamined Patent Application Publication No. 2013-021886 (paragraphs [0044]-[0048] and FIG. 6) proposes a charging device that adjusts the three-dimensional positions of a transmitter and a receiver by configuring a relay device for relaying electric power such that the relay device can move in a horizontal, vertical, or rotational direction.

SUMMARY

According to one aspect of the present invention, a non-contact charging system includes a charging device and a mobile object. The charging device includes a transmitter that transmits electric power using a magnetic field. The mobile object includes a receiver that receives the electric power from the charging device through the transmitter. The transmitter is fixed at a predetermined position in a charging area. The receiver is fixed in the mobile object. When the mobile object enters the charging area, a power transmission surface of the transmitter faces a power reception surface of the receiver. At least one of the power transmission surface and the power reception surface is tilted relative to ground in the charging area in a longitudinal direction of the mobile object.

According to another aspect of the present invention, a non-contact charging system includes a charging device and a mobile object. The charging device includes a transmitter. The transmitter is provided at a predetermined position in a charging area and has a power transmission surface to transmit electric power using a magnetic field. The mobile object includes a receiver. The receiver is provided in the mobile object and has a power reception surface to receive the electric power from the charging device through the transmitter. The power transmission surface faces the power reception surface when the mobile object enters the charging area. At least one of the power transmission surface and the power reception surface is tilted relative to ground in the charging area in a longitudinal direction of the mobile object.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

An embodiment of a non-contact charging system according to the present application will be specifically described with reference to the drawings.

[Embodiment]

<Configuration of Non-contact Charging System 10>

Figure 1:
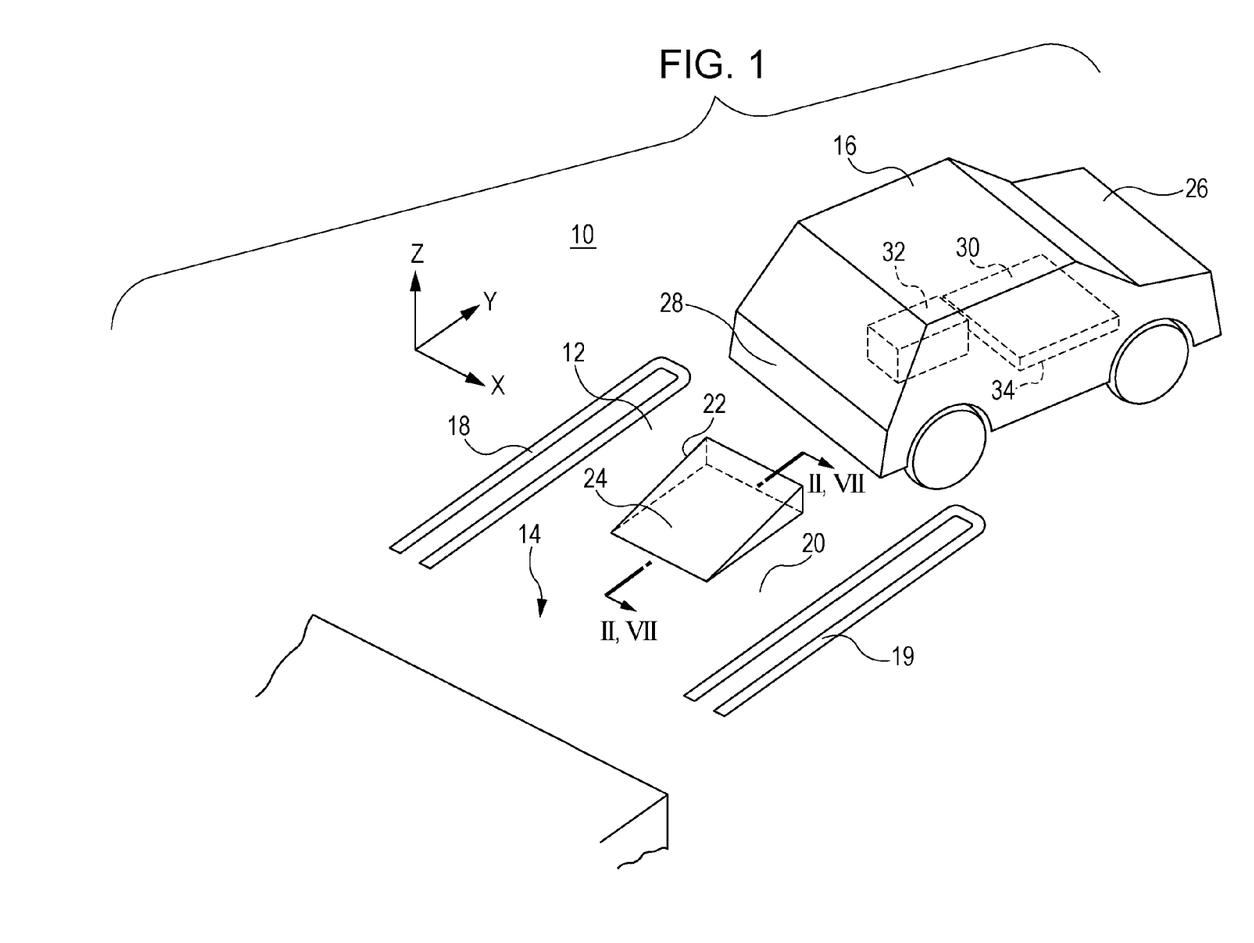
FIG. 1 is a perspective view schematically illustrating a configuration of a non-contact charging system according to an embodiment.
Figure 2:
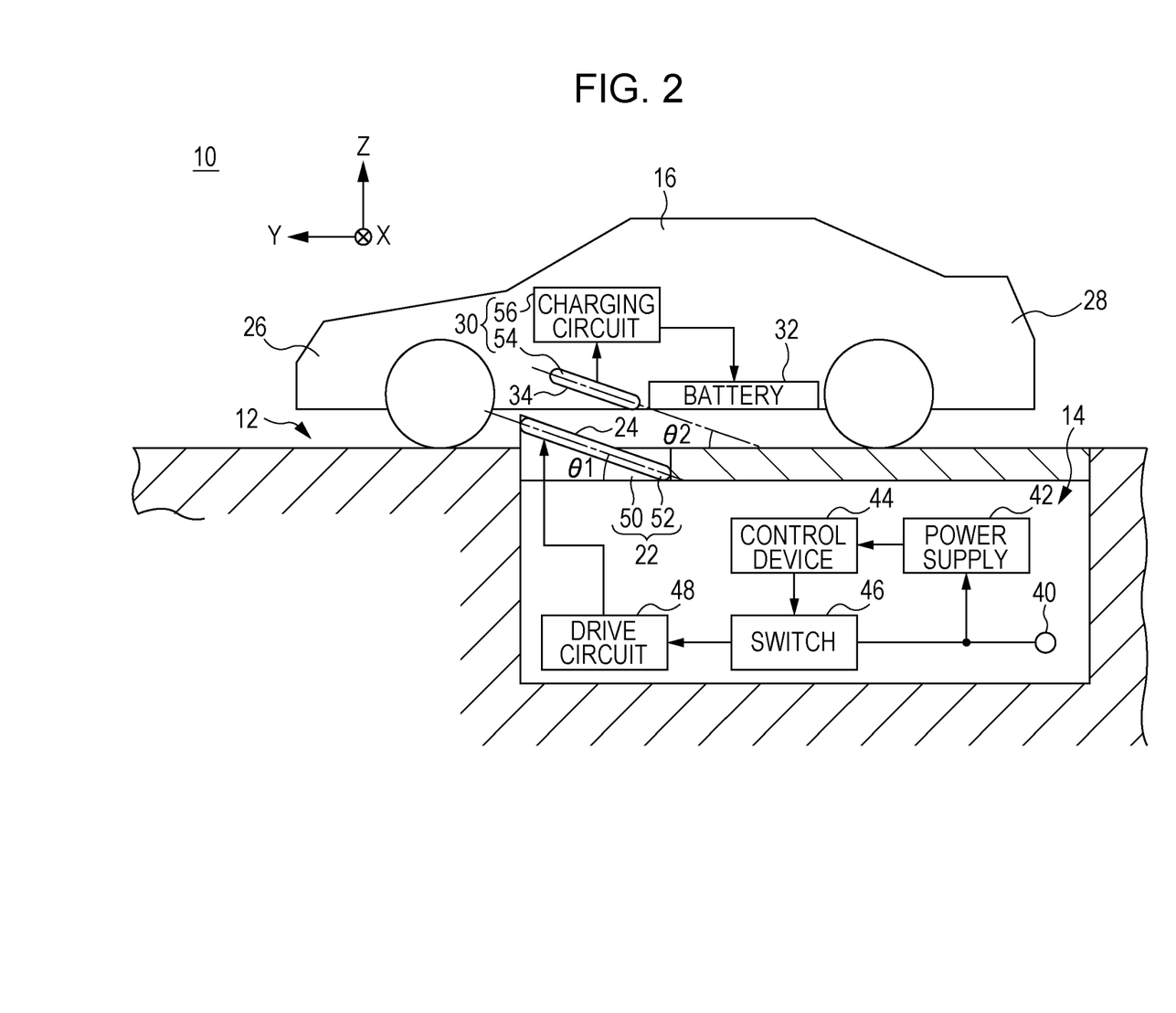
FIG. 2 is a schematic cross-sectional view taken along line II-II in FIG. 1.

FIG. 1 is a perspective view schematically illustrating a configuration of a non-contact charging system 10 according to this embodiment. FIG. 2 is a schematic cross-sectional view taken along line II-II in FIG. 1.

As illustrated in FIG. 1, the non-contact charging system 10 includes a charging device 14 provided in a charging area 12 and an electric vehicle (hereinafter simply referred to as a "vehicle 16") that is an example of a mobile object. The charging area 12 is defined by left and right separation lines 18 and 19, and is large enough to accommodate one vehicle 16. A transmitter 22 that transmits electric power by using a magnetic field is fixed at a predetermined position (ground 20) in the charging area 12. In the illustrated example, the transmitter 22 is partially embedded, and a power transmission surface 24 of the transmitter 22 is partially exposed.

A receiver 30 that receives electric power from the charging device 14 and a battery 32 (a power storage unit) of, for example, a secondary battery are mounted between a front part 26 and a rear part 28 of the vehicle 16. The receiver 30 is fixed in the vehicle 16, and a power reception surface 34 of the receiver 30 faces toward the ground 20. In this manner, when the vehicle 16 enters the charging area 12, the power transmission surface 24 and the power reception surface 34 face each other.

As illustrated in FIG. 2, in addition to the transmitter 22 (see FIG. 1), the charging device 14 also includes an alternating current (AC) outlet 40, a power supply 42, a control device 44, a switch 46, and a drive circuit 48.

The charging device 14 receives AC power from a commercial power supply through an AC outlet 40, and supplies the AC power to the power supply 42 or the switch 46. From input AC power, the power supply 42 generates a direct current (DC) power supply (voltage) for driving an internal circuit (including the control device 44). For example, the control device 44 accepts a request signal from the vehicle 16 and then closes the switch 46, thereby supplying AC power to the drive circuit 48. The drive circuit 48 generates pulse signals in predetermined cycles using the AC power.

The transmitter 22 in the charging device 14 includes an approximately triangular prism-shaped base 50 and a primary coil 52 which is placed on the base 50 and around which a conductive wire of a conductor including a metal is wound. An AC current is caused to flow in the primary coil 52 by a pulse signal from the drive circuit 48. Electromagnetic induction caused by this AC current supplies power to a secondary coil 54 in the vehicle 16.

On the other hand, the receiver 30 in the vehicle 16 includes the secondary coil 54 around which a conductive wire of a conductor including a metal is wound and a charging circuit 56 for charging the battery 32. The charging circuit 56 is an AC to DC converter that is capable of converting AC power output from the secondary coil 54 into DC.

The non-contact charging technique is not limited to electromagnetic induction, and various techniques including electrostatic induction, magnetic resonance, and electric field resonance may be employed. The configurations of the transmitter 22 and the receiver 30 may be appropriately changed depending on the charging technique.

<Adjustment of Relative Positions of Transmitter 22 and Receiver 30>

Figure 3A:
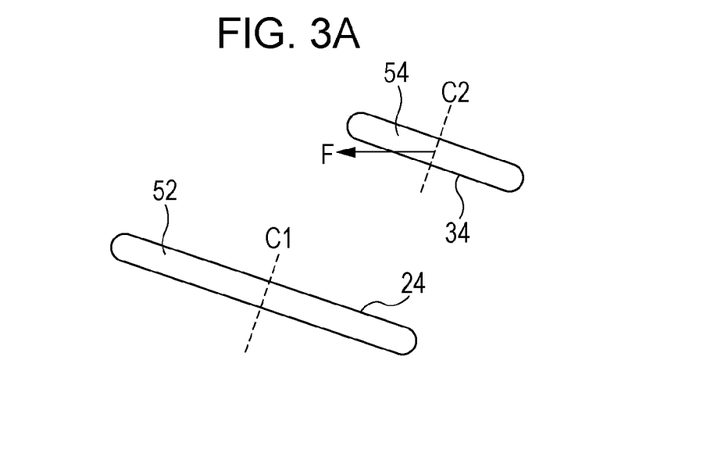
FIGS. 3A to 3C schematically illustrate positional relationships between a primary coil and a secondary coil.
Figure 3B:
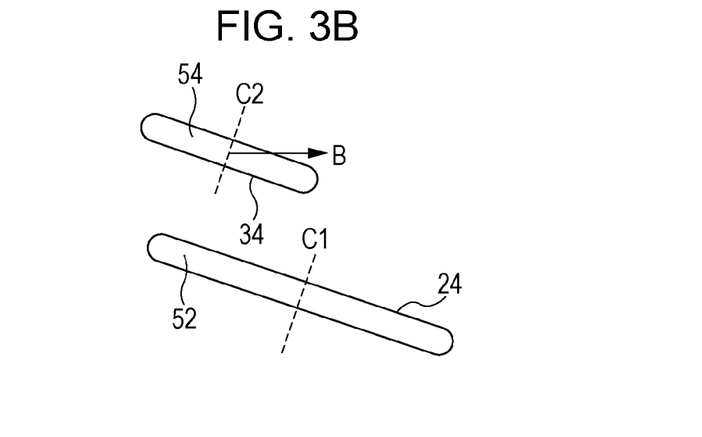

Referring now to FIGS. 3A and 3B, a method for adjusting the relative positions of the transmitter 22 and the receiver 30 will be described. The following description is based on the assumption that the positional adjustment in an X-axis direction (i.e., a lateral direction) has been completed.

Figure 3C:
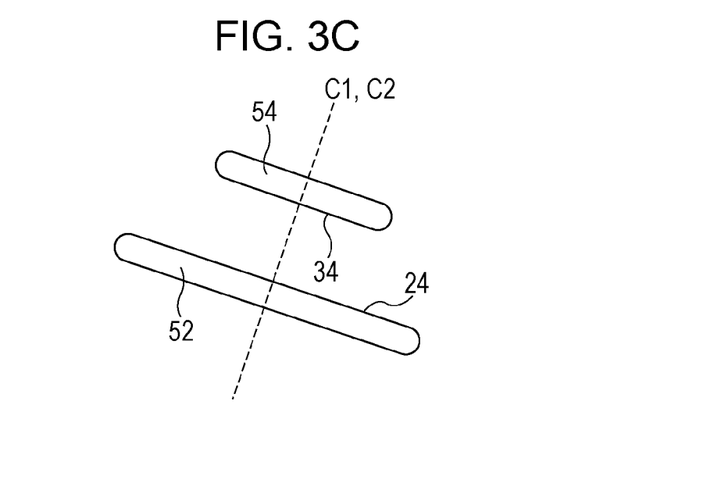

FIGS. 3A to 3C schematically illustrate positional relationships between the primary coil 52 and the secondary coil 54. In the drawings, the center axis of the primary coil 52 is represented as C1, and the center axis of the secondary coil 54 is represented as C2.

In the example illustrated in FIG. 3A, the center axis C2 is located to the right of the center axis C1. Thus, the vehicle 16 is moved in the direction indicated by the arrow F, thereby adjusting the relative positions of the primary coil 52 and the secondary coil 54. Here, the direction indicated by the arrow F coincides with the forward direction (the positive direction on the Y axis) of the vehicle 16. In this manner, movement of the vehicle 16 in the charging area 12 in the direction indicated by the arrow F enables the relative positions of the transmitter 22 and the receiver 30 in the longitudinal direction (the positive direction on the Y axis) and the direction normal to the ground 20 (a Z-axis direction) to be changed at the same time.

In the example illustrated in FIG. 3B, the center axis C2 is located to the left of the center axis C1. Thus, the vehicle 16 is moved in the direction indicated by the arrow B, thereby adjusting the relative positions of the primary coil 52 and the secondary coil 54. Here, the direction indicated by the arrow B coincides with the rearward direction (the negative direction on the Y axis) of the vehicle 16. In this manner, movement of the vehicle 16 in the charging area 12 in the direction indicated by the arrow B enables the relative positions of the transmitter 22 and the receiver 30 in the longitudinal direction (the negative direction on the Y axis) and the direction normal to the ground 20 (the Z-axis direction) to be changed at the same time.

In the example illustrated in FIG. 3C, the center axis C2 coincides with the center axis C1. Thus, the positional adjustment of the primary coil 52 and the secondary coil 54 is completed. Under this situation, the transmission efficiency of electric power is approximately at maximum. In particular, in a case where the power transmission surface 24 is in parallel with the power reception surface 34 (i.e., $\theta 1 = \theta 2$), the highest transmission efficiency can be obtained by adjusting the relative positional displacement between the transmitter 22 and the receiver 30.

Figure 4A:
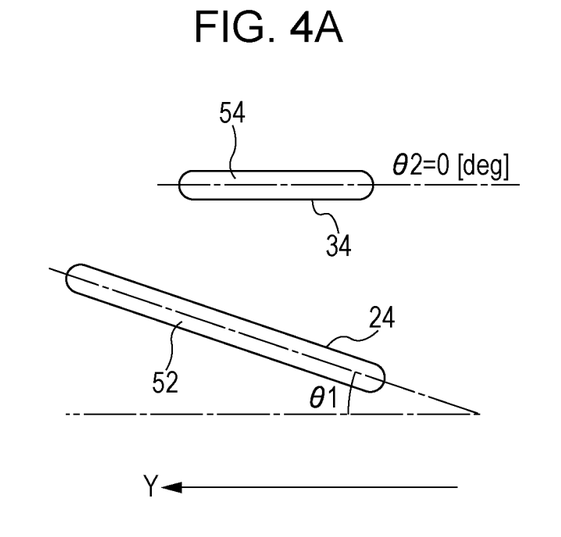
FIGS. 4A and 4B schematically illustrate examples of selection of tilt angles at a power transmission surface and a power reception surface.
Figure 4B:
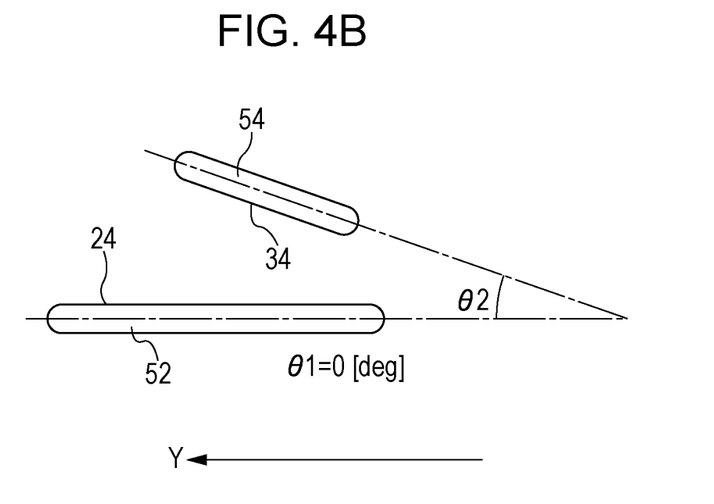

In the example illustrated in FIG. 4A, the tilt angle $\theta 2$ of the power reception surface 34 is $\theta 2 = 0$ [deg]. In the example illustrated in FIG. 4B, the tilt angle $\theta 1$ of the power transmission surface 24 is $\theta 1 = 0$ [deg]. In this manner, as long as one of the power transmission surface 24 or the power reception surface 34 is tilted, advantages similar to those obtained in the cases of FIGS. 3A and 3B can be obtained.

As described above, at least one of the power transmission surface 24 of the transmitter 22 or the power reception surface 34 of the receiver 30 is tilted relative to the ground 20 in the charging area 12 in the longitudinal direction of the vehicle 16. Thus, movement of the vehicle 16 in the charging area 12 in the longitudinal direction (i.e., the direction indicated by the arrow F or the arrow B) enables the relative positions of the transmitter 22 and the receiver 30 in the longitudinal direction and the direction normal to the ground 20 to be changed at the same time. As a result, the relative positional displacement between the transmitter 22 and the receiver 30 can be effectively adjusted with a very simple configuration.

<Method for Selecting Tilt Angles $\theta 1$ and $\theta 2$>

Figure 5A:
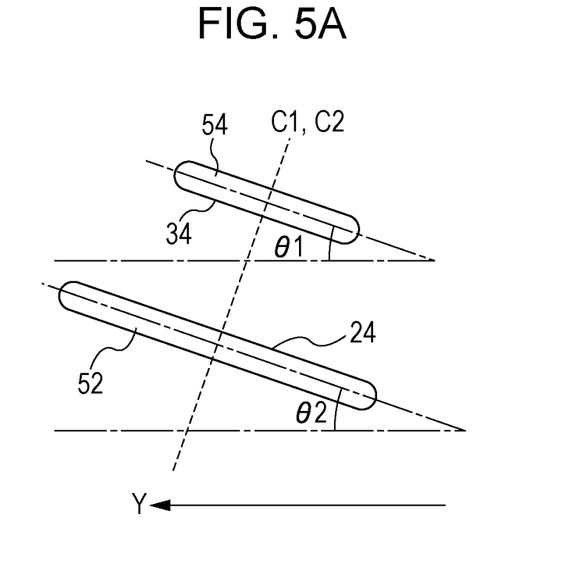
FIG. 5A schematically illustrates a positional relationship between the primary coil and the secondary coil when the center axes thereof coincide with each other.
Figure 5B:
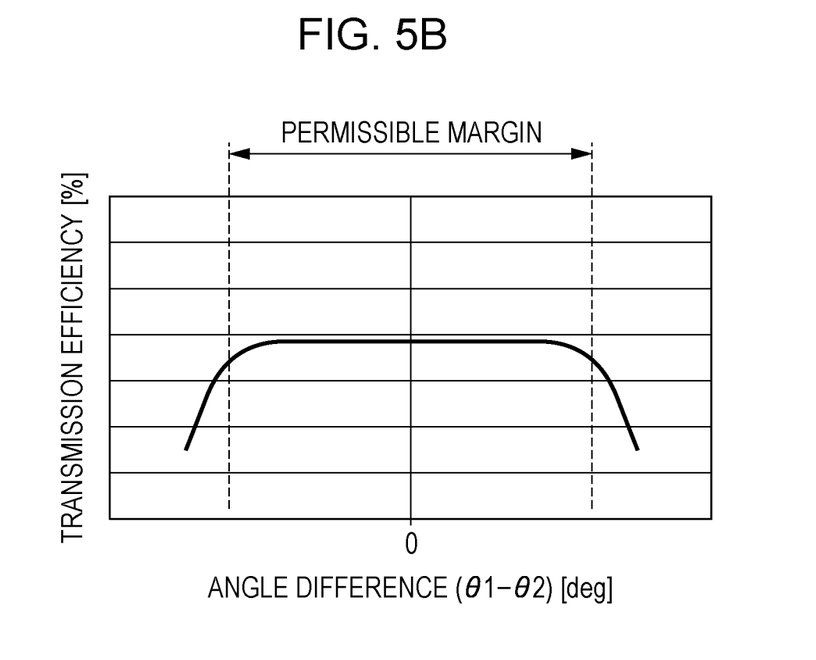
FIG. 5B is a graph showing variation characteristics of a transmission efficiency with respect to an angle difference.

Referring now to FIGS. 5A and 5B, a method for selecting the tilt angles $\theta 1$ and $\theta 2$ will be described. FIG. 5A schematically illustrates a positional relationship between the primary coil 52 and the secondary coil 54 in a case where the center axes C1 and C2 coincide with each other. The tilt angle of the power transmission surface 24 (the primary coil 52) will be hereinafter referred to as $\theta 1$, and the tilt angle of the power reception surface 34 (the secondary coil 54) will be hereinafter referred to as $\theta 2$.

FIG. 5B is a graph showing variation characteristics of a transmission efficiency with respect to an angle difference. In the graph, the abscissa represents an angle difference (unit: deg), and the ordinate represents a transmission efficiency (unit: %). The angle difference corresponds to the difference between the tilt angles $\theta 1$ and $\theta 2$ (i.e., $\theta 1 - \theta 2$).

As shown in the graph, when the angle difference is within a predetermined range, the transmission efficiency is substantially constant. On the other hand, when the angle difference is out of the predetermined range, the charging efficiency rapidly decreases. Thus, the power transmission surface 24 and the power reception surface 34 are tilted such that the difference between the tilt angles θ1 and θ2 in the longitudinal direction is within the predetermined range, thereby reducing a decrease in the transmission efficiency of electric power due to the difference between the tilt angles θ1 and θ2. In other words, high transmission efficiency can be maintained irrespective of the individual differences and type of the vehicle 16 by previously selecting the range in which the transmission efficiency of electric power does not decrease (e.g., a region where a decrease rate is less than 1%) as a "permissible margin."

In the example shown in FIG. 5B, the permissible margin of the angle difference is defined on the basis of transmission efficiency. However, the technique disclosed herein is not limited to this physical quantity, and various physical quantities associated with the transmission efficiency may be employed. For example, in the case of taking variation characteristics of a leakage magnetic field into consideration, a range where an intensity of a leakage magnetic field (i.e., a leakage flux) does not increase may be defined as a "permissible margin."

<Other Advantages>

Other advantages as well as the increased transmission efficiency described above can be obtained especially by tilting the power transmission surface 24. Now, description will be given with reference to FIGS. 6A-6D.

Figure 6A:
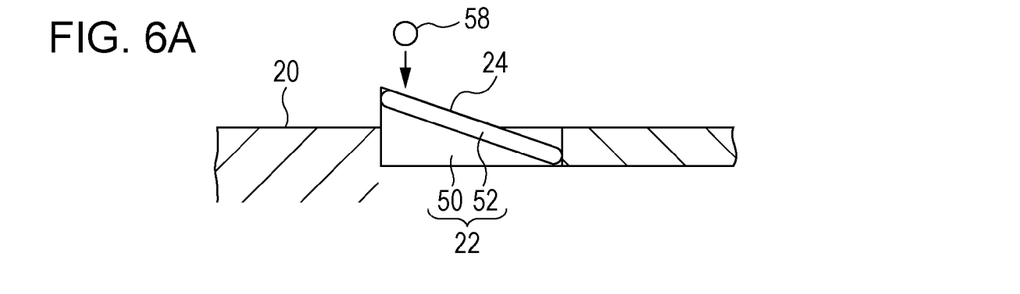
FIGS. 6A-6D are schematic illustrations concerning other advantages of the non-contact charging system.
Figure 6B:
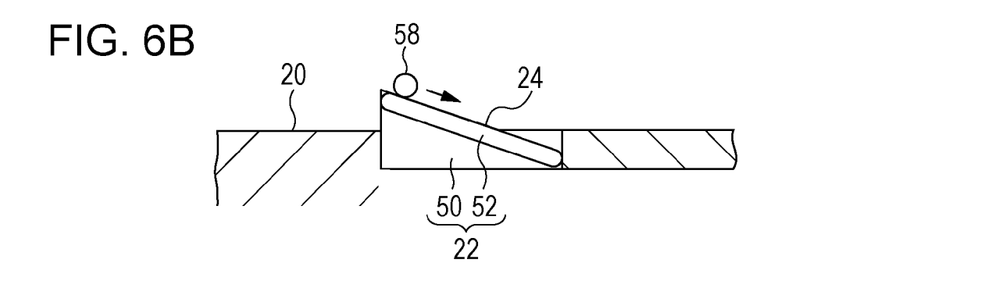
Figure 6C:
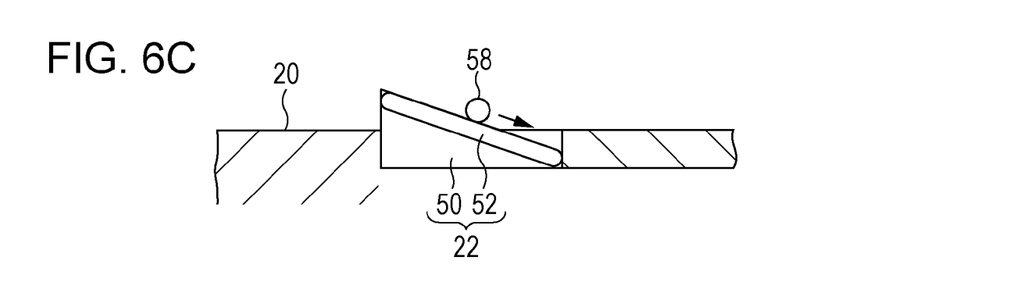
Figure 6D:
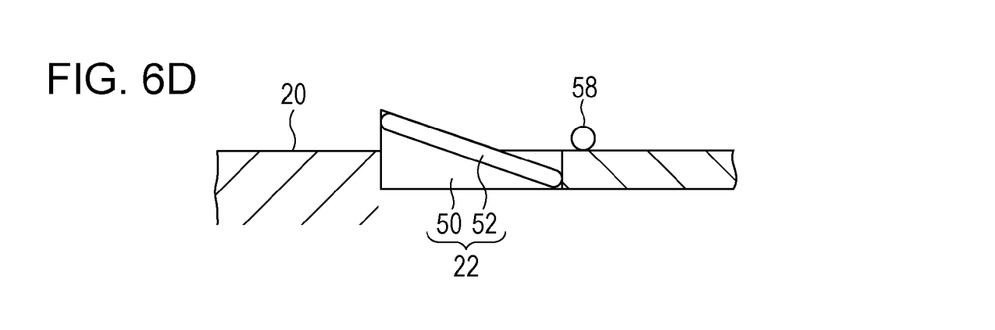

As illustrated in FIG. 6A, suppose an approximately spherical foreign body 58 falls toward the power transmission surface 24. The foreign body 58 might reduce the transmission efficiency of electric power and generate heat when receiving an AC magnetic field.

However, since the power transmission surface 24 is tilted relative to the ground 20, the fallen foreign body 58 moves downward along the power transmission surface 24 under its own weight (see FIGS. 5B and 5C). Consequently, the foreign body 58 stops on the ground 20 at a location away from the power transmission surface 24. This configuration eases removal of the foreign body 58 on the power transmission surface 24, and prevents drawbacks such as a decrease in transmission efficiency. In addition, since sensors for detecting the foreign body 58 are not needed, an initial cost for the non-contact charging system 10 can be reduced.

[Variations]

Referring now to FIGS. 7 to 9B, first and second variations of this embodiment will be described. Components of the configuration substantially equivalent to those of the embodiment are denoted by the same reference numerals, and description thereof is not repeated.

<First Variation>

Figure 7:
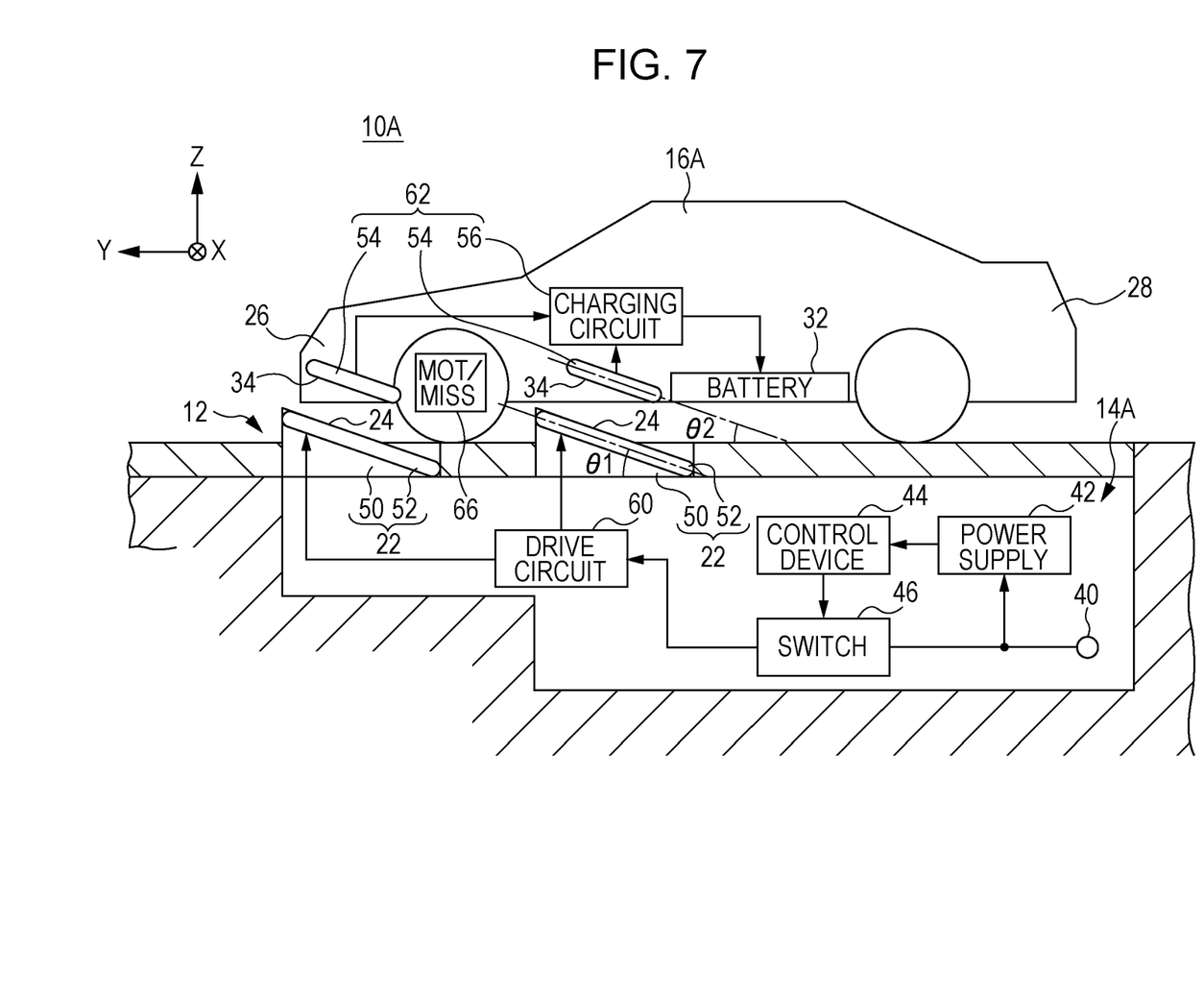
FIG. 7 is a cross-sectional view schematically illustrating a non-contact charging system according to a first variation.

FIG. 7 is a cross-sectional view schematically illustrating a non-contact charging system 10A according to a first variation. The non-contact charging system 10A basically includes a charging device 14A and a vehicle 16A, in a manner similar to FIG. 2. The charging device 14A is different from the charging device 14 (see FIG. 2) in that it includes two transmitters 22 and a drive circuit 60 for driving the transmitters 22 and 22. Each of the two transmitters 22 has a tilt angle of θ1.

The vehicle 16A includes a receiver 62, instead of the receiver 30 shown in FIG. 2. The receiver 62 includes two secondary coils 54 and a charging circuit 64 connected to the secondary coils 54. A motor/transmission 66 for driving front wheels of the vehicle 16 is disposed at the rear of the secondary coil 54 near the front part 26.

The vehicle 16A includes at least one high-voltage component. Here, a battery 32 and the motor/transmission 66 are shown as high-voltage components. The receiver 62 (especially secondary coils 54 and 54) and the high-voltage components are arranged side by side and disposed close to each other or in contact with each other along the longitudinal direction (the Y-axis direction) of the vehicle 16. The power reception surface 34 is tilted relative to the direction normal to one surface of the high-voltage components facing the receiver 62.

Figure 8A:
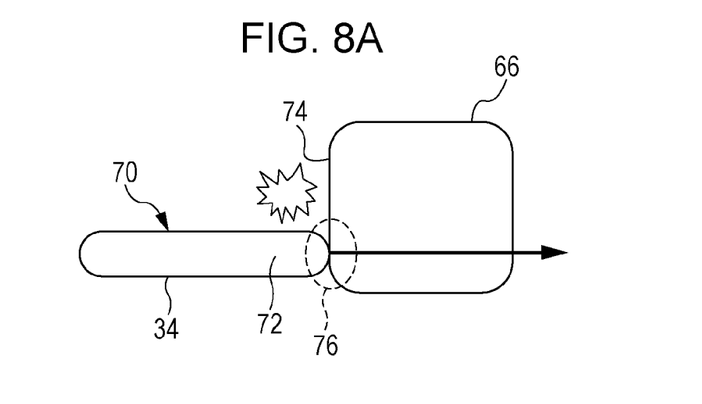
FIGS. 8A-8C schematically illustrate distributions of an impact load applied to a motor/transmission.
Figure 8B:
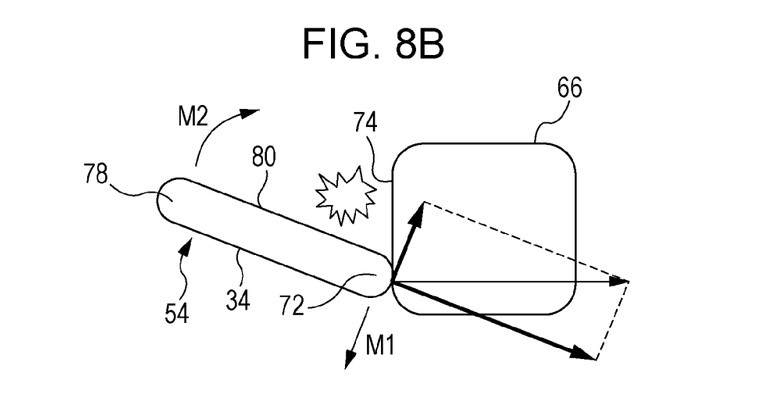
Figure 8C:
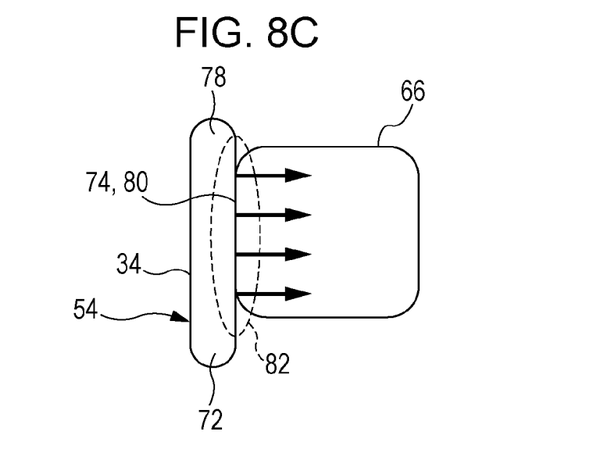

Referring now to FIGS. 8A-8C, reasons for disposing the receiver 62 and the high-voltage components in the positional relationship described above will be described. FIGS. 8A-8C schematically illustrate distributions of an impact load applied to the motor/transmission 66.

FIG. 8A is a schematic illustration of a comparative example, where a power reception surface 34 is in parallel with the direction normal to a surface (a closest surface 74 that is closest to a secondary coil 70) of a motor/transmission 66 facing the secondary coil 70. For example, when an impact load is applied to the receiver 62, an end 72 of the secondary coil 70 collides with the closest surface 74 of the motor/transmission 66. At this time, since the area of a contact portion 76 is small, stress generated by the collision tends to be focused on a specific portion.

FIG. 8B is a schematic illustration of this variation, where the power reception surface 34 is tilted toward the direction normal to the closest surface 74 of the motor/transmission 66. For example, when an impact load is applied to the receiver 62, an end 72 of the secondary coil 54 collides with the closest surface 74 of the motor/transmission 66. At this time, since the tilt angle of the power reception surface 34 relative to the closest surface 74 is not zero, the impact load is dispersed in other directions as well as the direction normal to the closest surface 74. Thus, a reaction force acts on the end 72 in the direction indicated by the arrow M1, and a moment occurs on the other end 78 in the direction indicated by the arrow M2. Consequently, a further impact load is applied to the secondary coil 54 while the secondary coil 54 rotates clockwise.

Thereafter, as illustrated in FIG. 8C, a counter surface 80 facing the power reception surface 34 is brought into contact with the closest surface 74, thereby causing collision again. At this time, since the area of the contact portion 82 is large, the generated stress tends to be dispersed over the entire surface.

In this manner, the power reception surface 34 is tilted so that when an impact load is applied in the longitudinal direction, a moment that causes the power reception surface 34 (the secondary coil 54) to rotate tends to occur readily, and also to increase the contact area when the secondary coil 54 collides with the high-voltage components. As a result, a generated stress applied from the receiver to the high-voltage components can be reduced, thereby preventing the high-voltage components from being damaged.

To reproduce a behavior of applying an impact load onto a surface constantly as illustrated in FIGS. 8B and 8C, various parameters including the distance between the secondary coil 54 and the high-voltage components and the tilt angle are preferably determined beforehand. The positional relationship (i.e., forward or rearward) between the receiver 62 and the high-voltage components and the number of high-voltage components may be appropriately changed.

<Second Variation>

Figure 9A:
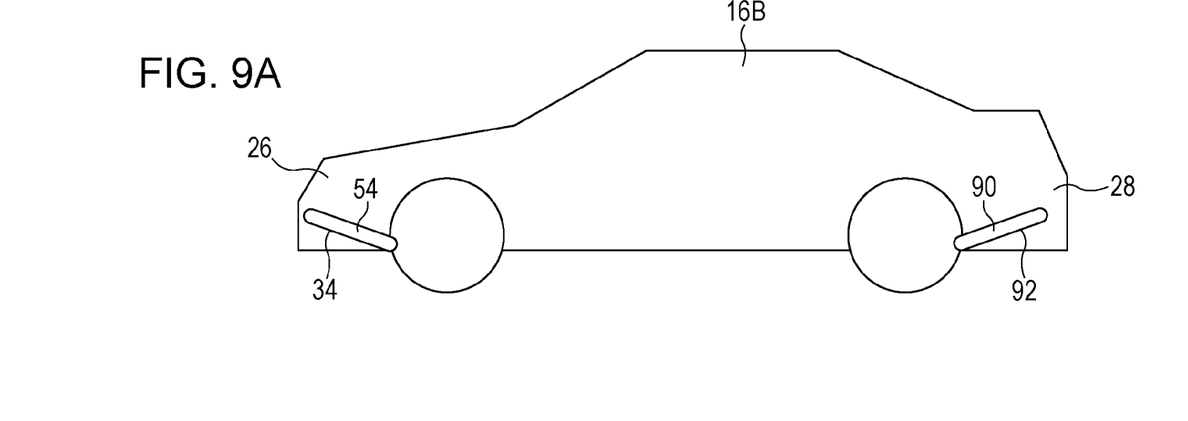
FIGS. 9A and 9B schematically illustrate a configuration of a vehicle according to a second variation.
Figure 9B:
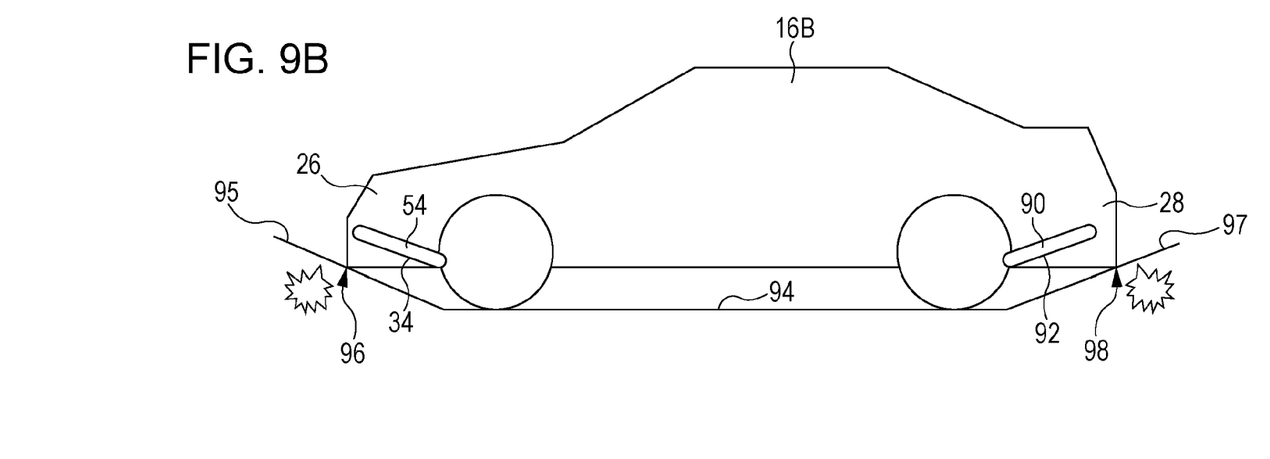

FIG. 9A schematically illustrates a vehicle 16B according to a second variation. In the vehicle 16B, the secondary coil 54 is disposed in the front part 26, and a secondary coil 90 is disposed in the rear part 28. Each of the power reception surface 34 of the secondary coil 54 and the power reception surface 92 of the secondary coil 90 is upwardly inclined toward the outside in the longitudinal direction in a side view of the vehicle 16. Referring now to FIG. 9B, reasons for disposing the secondary coils 54 and 90 at the above-described positions will be described.

As illustrated in FIG. 9B, an ascending road surface 95 is located in front of a flat road surface 94. While the vehicle 16B is running on the road surface 94, occurrence of pitching or other factors might bring the front part 26 into contact with the road surface 95. To prevent this contact, the power reception surface 34 is designed to ascend gradually away from the lower surface of the front part 26 toward the front outer side. Thus, an interference between the power reception surface 34 and the road surface 95 in the contact portion 96 can be avoided.

In addition, a descending road surface 97 is located at the rear of the flat road surface 94. While the vehicle 16B is running on the road surface 94, occurrence of pitching or other factors might bring the rear part 28 into contact with the road surface 97. To prevent this contact, the power reception surface 92 is designed to ascend gradually away from the lower surface of the rear part 28 toward the rear outer side. Thus, an interference between the power reception surface 92 and the road surface 97 in the contact portion 98 can be avoided.

[Supplemental Notes]

The technique disclosed herein is not limited to the foregoing embodiment and the variations thereof, and of course, can be freely changed within the scope of this application.

In the embodiment and the variations thereof, one or two pairs of transmitters 22 and receivers 30 are provided. Alternatively, three or more pairs may be used, and the tilt angles θ1 and θ2 of these pairs may be the same or different from one another.

In the above embodiment, the charging area 12 is defined on a flat horizontal surface. Alternatively, the present disclosure is applicable to a case where the charging area 12 is defined on a tilted surface.

In the above embodiment, the electric vehicles have been described as examples of a mobile object. The present disclosure is also applicable to vehicles using electric power as their drive sources, e.g., hybrid vehicles (HEVs) and plug-in hybrid vehicles (PHEVs).

A non-contact charging system according to an aspect of the present disclosure includes: a charging device including a transmitter that transmits electric power using a magnetic field; and a mobile object including a receiver that receives the electric power from the charging device through the transmitter, wherein the transmitter is fixed at a predetermined position in a charging area, the receiver is fixed in the mobile object, when the mobile object enters the charging area, a power transmission surface of the transmitter faces a power reception surface of the receiver, and at least one of the power transmission surface or the power reception surface is tilted relative to ground in the charging area in a longitudinal direction of the mobile object.

Thus, since at least one of the power transmission surface of the transmitter or the power reception surface of the receiver is tilted relative to the ground in the charging area in the longitudinal direction of the mobile object, movement of the mobile object in the charging area in the longitudinal direction enables the relative positions between the transmitter and the receiver in the longitudinal direction and the height direction of the ground to be changed at the same time. In this manner, a relative positional displacement between the transmitter and the receiver can be effectively adjusted with a very simple configuration.

The power transmission surface and the power reception surface are preferably tilted such that a difference in tilt angle between the power transmission surface and the power reception surface in the longitudinal direction falls within a predetermined range when the mobile object is located within the charging area. In particular, the predetermined range is preferably a range in which a transmission efficiency of the electric power does not decrease or a range in which an intensity of a leakage magnetic field does not increase. Then, it is possible to reduce a decrease in transmission efficiency of electric power or an increase in intensity of a leakage magnetic field due to the tilt angle difference.

The power transmission surface is preferably in parallel with the power reception surface while the mobile object is located within the charging area. With this configuration, a relative positional displacement between the transmitter and the receiver is adjusted, thereby obtaining a maximum transmission efficiency.

Preferably, the receiver is located at an end in the longitudinal direction of the mobile object, and the power reception surface is upwardly inclined toward an outside in the longitudinal direction in a side view of the mobile object. Since the power reception surface is tilted away from the lower surface of an end toward an outside in the longitudinal direction, interference with, for example, the road surface tilted at a large angle can be reduced.

Preferably, the mobile object further includes at least one high-voltage component, the receiver and the high-voltage component are located close to each other or in contact with each other along the longitudinal direction, and the power reception surface is tilted relative to a direction normal to a surface of the high-voltage component facing the receiver. Since the power reception surface is tilted as described above, a moment that rotates the power reception surface tends to occur readily upon application of an impact load in the longitudinal direction so that the contact area in collision with the high-voltage component increases. In this manner, stress on the high-voltage component from the receiver can be reduced, and damage of the high-voltage component can be reduced.

In the non-contact charging system according to an aspect of the present disclosure, at least one of the power transmission surface of the transmitter or the power reception surface of the receiver is tilted relative to the ground in the charging area in the longitudinal direction of the mobile object. Thus, movement of the mobile object in the charging area in the longitudinal direction enables the relative positions of the transmitter and the receiver in the longitudinal direction and the height direction of the ground to be changed at the same time. In this manner, a relative positional displacement between the transmitter and the receiver can be effectively adjusted with a very simple configuration.

Obviously, numerous modifications and variations of the present invention are possible in light of the above teachings. It is therefore to be understood that within the scope of the appended claims, the invention may be practiced otherwise than as specifically described herein.

What is claimed is:

1. A non-contact charging system comprising:
a charging device including a transmitter that transmits electric power using a magnetic field; and
a mobile object including a receiver that receives the electric power from the charging device through the transmitter, wherein
the transmitter is fixed at a predetermined position in a charging area,
the receiver is fixed in the mobile object,
when the mobile object enters the charging area, a power transmission surface of the transmitter faces a power reception surface of the receiver, and at least one of the power transmission surface and the power reception surface is tilted relative to ground in the charging area in a longitudinal direction of the mobile object.

2. The non-contact charging system of claim 1, wherein the power transmission surface and the power reception surface are tilted such that a difference in tilt angle between the power transmission surface and the power reception surface in the longitudinal direction falls within a predetermined range when the mobile object is located within the charging area.

3. The non-contact charging system of claim 2, wherein the predetermined range is a range in which a transmission efficiency of the electric power does not decrease or a range in which an intensity of a leakage magnetic field does not increase.

4. The non-contact charging system of claim 3, wherein the power transmission surface is in parallel with the power reception surface while the mobile object is located within the charging area.

5. The non-contact charging system of claim 1, wherein the receiver is located at an end in the longitudinal direction of the mobile object, and
the power reception surface is upwardly inclined toward an outside in the longitudinal direction in a side view of the mobile object.

6. The non-contact charging system of claim 1, wherein the mobile object further includes at least one high-voltage component,
the receiver and the high-voltage component are located close to each other or in contact with each other along the longitudinal direction, and
the power reception surface is tilted relative to a direction normal to a surface of the high-voltage component facing the receiver.

7. A non-contact charging system comprising:
a charging device comprising:
a transmitter provided at a predetermined position in a charging area and having a power transmission surface to transmit electric power using a magnetic field; and
a mobile object comprising:
a receiver provided in the mobile object and having a power reception surface to receive the electric power from the charging device through the transmitter, the power transmission surface facing the power reception surface when the mobile object enters the charging area, at least one of the power transmission surface and the power reception surface being tilted relative to ground in the charging area in a longitudinal direction of the mobile object.

8. The non-contact charging system according to claim 7, wherein the transmitter is fixed at the predetermined position in the charging area and wherein the receiver is fixed in the mobile object.

9. The non-contact charging system according to claim 7, wherein
the power transmission surface and the power reception surface are tilted such that a difference in tilt angle between the power transmission surface and the power reception surface in the longitudinal direction falls within a predetermined range when the mobile object is located within the charging area.

10. The non-contact charging system according to claim 9, wherein
the predetermined range is a range in which a transmission efficiency of the electric power does not decrease or a range in which an intensity of a leakage magnetic field does not increase.

11. The non-contact charging system according to claim 10, wherein
the power transmission surface is in parallel with the power reception surface while the mobile object is located within the charging area.

12. The non-contact charging system according to claim 7, wherein
the receiver is located at an end of the mobile object in the longitudinal direction, and
the power reception surface is upwardly inclined toward an outside of the mobile object in the longitudinal direction in a side view of the mobile object.

13. The non-contact charging system according to claim 7, wherein
the mobile object further comprises at least one high-voltage component,
the receiver and the high-voltage component are located close to each other or in contact with each other along the longitudinal direction, and
the power reception surface is tilted relative to a direction normal to a surface of the high-voltage component facing the receiver.

14. The non-contact charging system according to claim 7, wherein
the charging device further comprises a controller, and
the controller controls the transmitter to transmit electric power to the mobile object using the magnetic field when the controller accepts a request signal from the mobile object.

15. The non-contact charging system according to claim 7, wherein
the transmitter is partially embedded in the ground of the charging area.

* * * * *